United States Patent [19]

Yoshii

[11] Patent Number: 4,988,121
[45] Date of Patent: Jan. 29, 1991

[54] SEAT BELT DEVICE FOR OPEN-TOP VEHICLE

[75] Inventor: Noboru Yoshii, Hiroshima, Japan

[73] Assignee: Mazda Motor Corporation, Hiroshima, Japan

[21] Appl. No.: 386,368

[22] Filed: Jul. 28, 1989

[30] Foreign Application Priority Data

Jul. 30, 1988 [JP] Japan .................. 63-191728

[51] Int. Cl.⁵ .................. B60J 7/12; B60R 22/24
[52] U.S. Cl. .................. 280/808; 296/186; 296/195
[58] Field of Search .......... 296/195, 186, 198, 219, 296/107, 108, 116, 117; 280/808, 801

[56] References Cited

U.S. PATENT DOCUMENTS

| | | | |
|---|---|---|---|
| 3,116,087 | 12/1963 | Baumann | 296/117 |
| 4,516,803 | 5/1985 | Kaltz et al. | 296/107 |
| 4,529,243 | 7/1985 | Kaltz et al. | 296/107 |
| 4,537,440 | 8/1985 | Brockway et al. | 296/107 |
| 4,828,317 | 5/1989 | Muscat | 296/116 |

FOREIGN PATENT DOCUMENTS

| | | | |
|---|---|---|---|
| 62-62526 | 4/1987 | Japan . | |
| 62-88642 | 4/1987 | Japan | 280/808 |
| 62-94455 | 4/1987 | Japan | 280/808 |

*Primary Examiner*—Charles A. Marmor
*Assistant Examiner*—Karin Tyson
*Attorney, Agent, or Firm*—Fleit, Jacobson, Cohn, Price, Holman & Stern

[57] ABSTRACT

A seat belt device for an open-top vehicle comprising a seat belt for fastening a passenger onto a seat, a support device of a closed cross-sectional structure mounted on a rear body portion of the vehicle at a position rearward of the seat for carrying the seat belt, and an extension extending rearwardly from the support device and fixed to the rear body portion so that the seat belt is drawn out forwardly to fasten the passenger securely. The support device is improved in strength against a force acting thereon.

12 Claims, 3 Drawing Sheets

SEAT BELT DEVICE FOR OPEN-TOP VEHICLE

BACKGROUND OF THE INVENTION

1. Field of the Invention

The present invention relates to a rear body structure of an automotive vehicle, and particularly to a seat belt device mounted on a rear side body structure of an open-top vehicle.

2. Description of the Prior Art

In mounting a seat belt device on the body of an open-top vehicle, it is known to mount a through-ring, through which a seat belt is extended to fasten a passenger and a seat belt retractor of the seat belt device, on a center pillar as shown in Japanese Utility Model Public Disclosure No. 62-62526, laid open to the public on Apr. 18, 1987.

U.S. Pat. Nos. 4,516,803, 4,529,243, and 4,537,440 disclose reinforcements for rear body structures of open-top vehicles provided with convertible roof devices.

It will be noticed from the structure of the open-top vehicle that the center pillar is substantially aligned in height with a belt line of the vehicle body. It follows that the mounting level of the through-ring is low in comparison with that of a vehicle having a fixed roof. This is because the center pillar extends up to the roof panel and is connected thereto in a vehicle having a roof fixed to the vehicle body.

With the structure of the seat belt device in the open-top vehicle, the seat belt is pulled out from a side position of a passenger and into closed cross-sectional contact with the passenger's shoulder. This structure of the seat belt is, however, disadvantageous in that the seat belt, which is extended over the passenger, tends to slip off from his shoulder because the level of the through-ring mounted on the center pillar is too low, also the through-ring is too close to the passenger, i.e., too far forward on a seat and proper fitting to the passenger's body is impaired.

SUMMARY OF THE INVENTION

It is therefore an object of the present invention to provide a rear body structure for an open-top vehicle in which a passenger can be safely fastened by a seat belt device.

It is another object of the present invention to provide a seat belt device for an open-top vehicle which is provided on a rear body portion of the vehicle.

It is still another object of the present invention to provide an open-top vehicle in which a seat belt device can be securely mounted on the rear body portion of the vehicle.

It is further object of the present invention to provide an open-top vehicle provided with a seat belt device securely fixed to a rear body portion a location where a convertible roof structure is retracted.

The above and other objects of the invention can be accomplished by seat belt device for an open-top vehicle comprising belt means for fastening a passenger onto a seat, support means mounted on a rear body portion of the vehicle at a position rearward of the seat for carrying the belt means, extension and means extending rearwardly from the support means and fixed to the rear body portion. The support means is joined with a floor panel constituting a rear body portion of the vehicle.

The support means preferably extends upwardly substantially as high as a shoulder of the passenger. The support means is preferably positioned at the outer side of the passenger seated on the seat, with regard to a transverse direction of the vehicle. The support means is joined with a floor panel at a position rearward of the seat in a preferred embodiment. The support means is of a closed cross structure in section or box structure. The support means preferably is provided with anchor means for mounting a through-ring through which the belt means extends to fasten the passenger, and top plate means on which the anchor means is mounted. The support means is spaced rearwardly from a front end of a fender or rear side body structure defining a rear end of a door opening.

In an embodiment of the present invention, the support means is located just inward of a storage portion for a foldable roof structure with regard to a transverse direction of the vehicle. The rear body portion may be provided with a rear fender panel extending longitudinally and defining a rear end of a door opening of the vehicle to constitute a rear outer side surface of the vehicle, a side panel connected with the rear fender panel at an outer portion and with a first plate member at an inner portion to constitute a storage portion for a foldable roof structure of the vehicle.

In this case, the first plate member is connected with the side panel, the first plate member being formed with a side wall portion constituting an outer side wall of the support means and with rear wall portion extending inwardly from an rear end of the side wall portion to constitute rear wall of the support means, the support means being provided with a second plate member connected with the side wall portion of the first plate member at an outer end to constitute a front wall of the support means. A third plate member connected with inner ends of both the second plate member is and the rear wall portion of the first plate member to form an inner wall and the extension of the support means.

A retractor is preferably disposed in a space defined by the support means and the belt means extending through an opening formed in the second plate member from the retractor to a passenger on the seat through the anchor means.

According to the present invention, the belt means is drawn out forwardly to fasten the passenger securely because the support means can be placed at a rearward position far enough to the rear to provide a tight contact with the passenger's body on the seat when it is applied or fastened. The support means is formed with the extension means with which the support means is fixed to the rear body portion so that the support means can be sufficiently upheld by the body of the vehicle against a force acting thereon.

The above and other features of the present invention will be apparent from the following description while taking reference to the accompanying drawings.

DESCRIPTION OF THE PREFERRED EMBODIMENT

Figure 1:
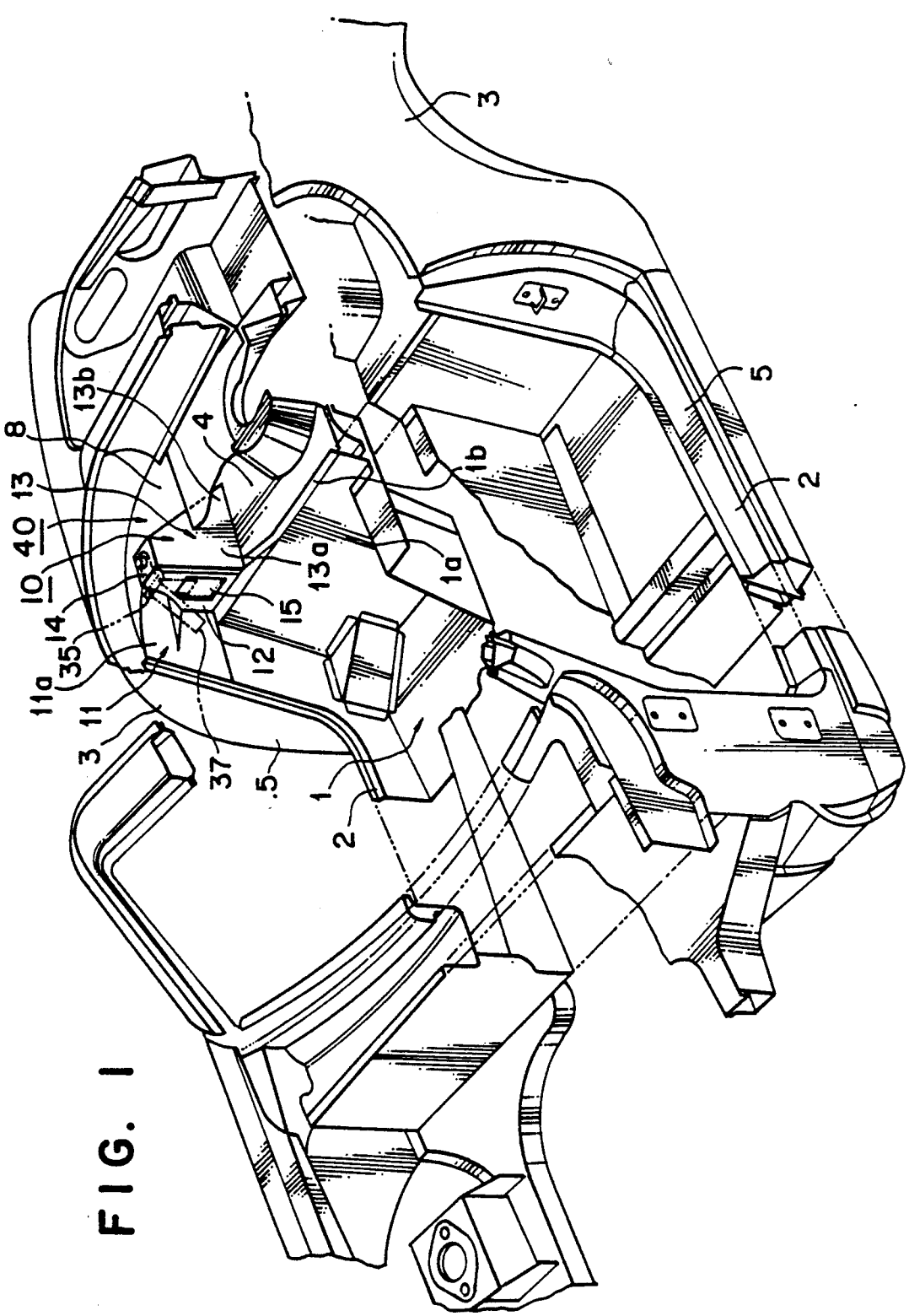
FIG. 1 is a perspective view which is partly broken away to show a rear body structure of an open-top vehicle to which the present invention can be applied.

Now, referring to the drawings, and specifically to FIG. 1, there is shown a perspective view of rear body portion of a two seater type open-top vehicle. The open top vehicle is provided with a floor panel 1 constituting a bottom portion of a passenger compartment, a pair of side sills 2 extending in a longitudinal direction of the vehicle and constituting opposite side structures of the floor panel, a pair of rear fender panels 3 constituting an outer surface of a rear side body portion rearward of a door opening 5. The floor panel 1 is formed with a slant portion 1a extending rearwardly and upwardly from a rear end in the vicinity of a front end of the rear fender panel 3. A rear end portion 1b of the slant portion 1a is connected with a front end of a rear floor panel 4 extending substantially horizontally and rearwardly. A seat (not shown) is arranged in front of the slant portion 1a. A pair of anchor towers 10 for passengers P seated on a right and left seat (only a right one is shown) are disposed opposite side portions of the rear floor panel 4 respectively. Each of the anchor towers 10 forms a support means mounted on the rear body portion of the vehicle. A groove-like storage section 40 of U-shaped configuration, in section, for a foldable roof structure or canvas top 50 is provided at an outer side of each of the anchor towers 10 in the rear body portion in a transverse direction the vehicle.

Figure 2:
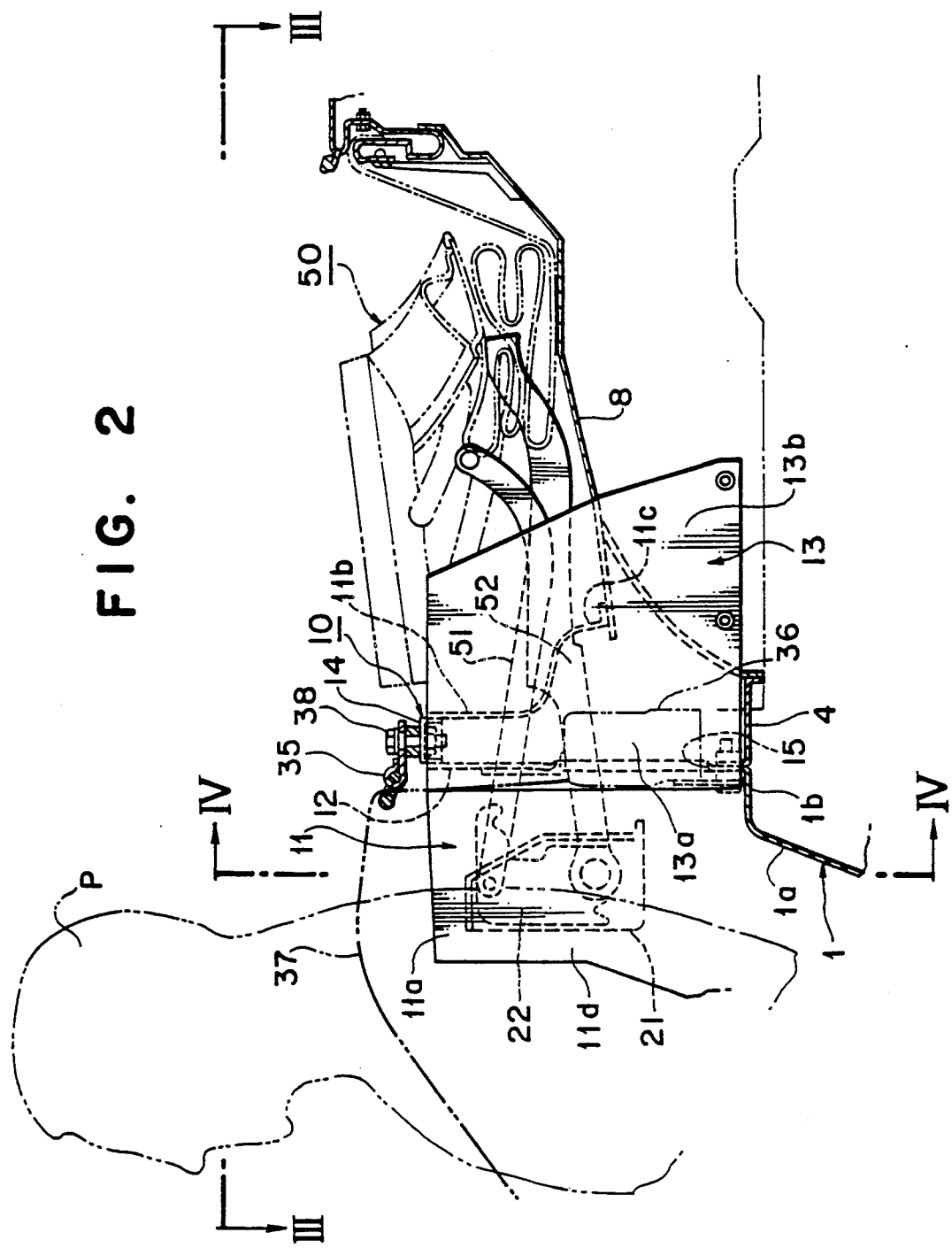
FIG. 2 is an enlarged side view of an anchor tower.
Figure 3:
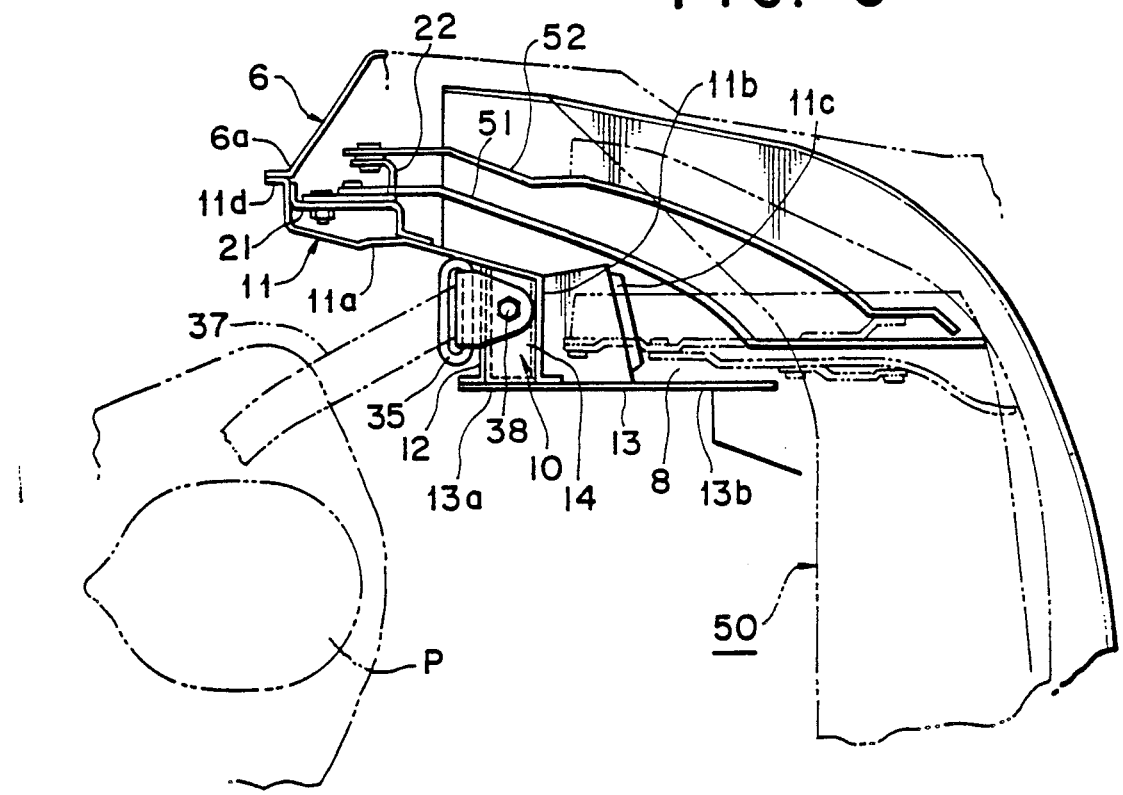
FIG. 3 is a sectional view as seen along a line III—III in FIG. 2.
Figure 4:
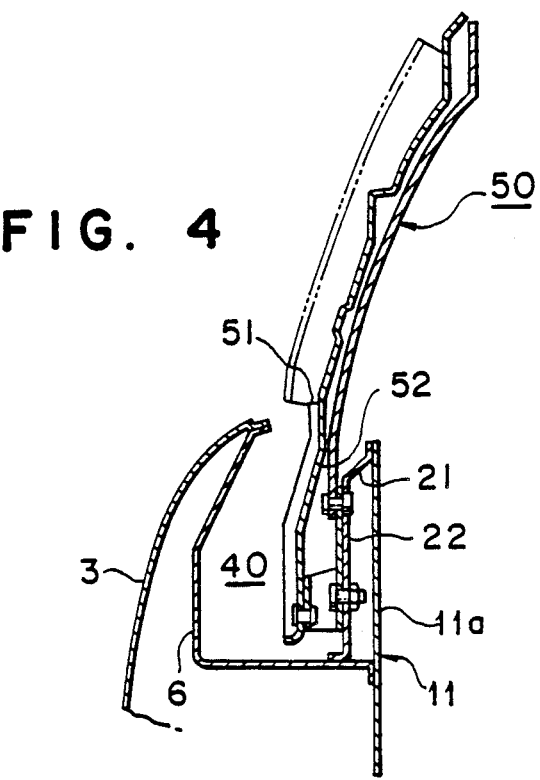
FIG. 4 is a sectional view as seen along a line IV—IV.

Referring to FIGS. 2 through 4 in addition to FIG. 1, the anchor tower 10 is constituted by a first, second, third and fourth plate members 11, 12, 13 and 14 to form a closed cross-sectioned structure in a manner of projecting upwardly from a corner portion of an upper surface of the rear floor panel 4.

The first plate member 11 is connected with a side panel 6 at a front end portion. The first plate member 11 extends rearwardly and inwardly in a horizontal plane as shown in FIG. 3. The first plate member 11 is provided with a side wall portion 11a constituting an outer side wall portion of the anchor tower 10, a rear wall portion 11b extending inwardly from a rear end of the side wall portion 11a to constitute a rear wall of the anchor tower 10, an extension 11c extending rearwardly from a rear bottom end portion of the rear wall portion 11b and joined with a tire house panel 8. The first plate member is connected with the side panel at a front end portion 11d. The side panel 6 is connected with the rear fender panel 3 at a top portion to form a rear body assembly.

The second plate member 12 is formed with an opening 15 at a lower portion for mounting a seat belt retractor 36. The second plate member 12 is spaced forwardly from the first plate member 11 and faces thereto to constitute a front wall portion of the anchor tower 10. The second plate member 12 is joined with the rear floor panel 4 at a lower end portion thereof, with the side wall portion 11a at an outer side end in the transverse direction of the vehicle and with a front portion 13a of the third plate member 13 at an inner side end portion.

The front portion 13a of the third plate member 13 constituting an inner wall portion of the anchor tower 10 is joined with inner side flange portions of the second plate member 12 and the rear wall portion 11b of the first plate member 11 respectively. The third plate member 13 is formed with a rib-like rear portion or extension 13b configured so as to extend rearwardly beyond the rear end of the flange portion of the rear wall portion 11b of the first plate member 11 and joined with the tire house panel 8.

The fourth plate member 14 constitutes an upper surface of the anchor tower 10 to cover an upper opening of a box assembly defined by the side wall portion 11a of the first plate member 11, the rear wall portion 11b of the plate member 11, second plate member 12 and the third plate member 13. A through-ring 35 is mounted on the fourth plate member 14 by means of a bolt 38. The seat belt retractor 36 is disposed in the anchor tower 10, which is of a box-like configuration. A seat belt 37 is drawn out from the retractor 36 through the opening 15 and the through ring 35. Thereafter, the seat belt 37 is drawn forwardly to contract over and return the passenger's shoulder to thereby fasten the passenger P to the seat securely, as shown in FIGS. 2 and 3.

According to the illustrated embodiment, a groove-like storage portion is formed to extend rearwardly from the transversely outer side position of the anchor tower along a peripheral portion of the rear body of the vehicle. In this case, a first bracket 21 is mounted on the outer surface of the side wall portion 11a of the first plate 11. A second bracket 22 of U-shaped configuration is pivotally mounted on the first bracket 21. The canvas top 50 is provided with a first link 51 and second link 52 for carrying the canvas top 50 for a pivotal movement between a folded condition wherein the canvas top is retracted into the storage portion 40 as shown in FIGS. 2 and 3 and an expanded condition wherein the canvas top 50 covers a roof portion of the vehicle as shown in FIG. 4. For this purpose, the links 51 and 52 are pivotally supported by the second bracket 22 at base portions thereof.

Although the present invention has been described with reference to the specific embodiment, it is apparent from the disclosure to those skilled in the art that various changes, and modifications can be made without departing from the spirit of the present invention. It is therefore to be understood that it is not intended to limit the invention to the specific embodiment disclosed.

I claim:

1. A seat belt device for an open-top vehicle comprising:
    belt means for fastening a passenger onto a seat,
    support means mounted on a rear body portion of the vehicle at a position rearward of the seat for carrying the belt means,
    extension means extending rearwardly from the support means and fixed to the rear body portion,
    a rear fender panel provided on said rear body portion and extending longitudinally and defining a rear end of a door opening of the vehicle to constitute a rear outer side surface of the vehicle,
    a first plate member,
    a side panel connected with the rear fender panel at an outer portion and with said first plate member at an inner portion to constitute a storage portion for a foldable roof structure of the vehicle, the first plate member being connected with the side panel, the first plate member being formed with a side wall portion constituting an outer side wall of the support means and with a rear wall portion extending inwardly from a rear end of the side wall portion to constitute a rear wall of the support means, the support means being provided with a second plate member connected with the side wall portion of the first plate member at an outer end to constitute a front wall of the support means, and a third plate member connected with inner ends of both the second plate member and the rear wall portion of the first plate member to form an inner wall and the extension means extending rearwardly from the support means.

2. A seat belt device as recited in claim 1 wherein the support means is positioned on an outer side of the passenger seated on the seat with regard to a transverse direction of the vehicle.

3. A seat belt device as recited in claim 1 wherein the support means is joined with a floor panel at a position rearward of the seat.

4. A seat belt device as recited in claim 1 wherein the support means has a structure which is closed in cross-section.

5. A seat belt device as recited in claim 4 wherein the support means is provided with anchor means for mounting a through-ring through which the belt means extends to fasten the passenger, and top plate means on which the anchor means is mounted.

6. A seat belt device as recited in claim 1 wherein the support means is located just inward of said storage portion for a foldable roof structure with regard to a transverse direction of the vehicle.

7. A seat belt device as recited in claim 1 wherein a retractor is arranged in a space defined by the support means and the belt means extending through an opening formed in the second plate member from the retractor to a passenger on the seat through the anchor means.

8. A seat belt device as recited in claim 1 wherein the first plate member is provided with an extension extending rearwardly from a rear bottom end portion of the rear wall portion and joined with a tire house panel.

9. A seat belt device as recited in claim 1 wherein the third plate member is formed with a rib-like extension extending rearwardly beyond the rear end of the flange portion of the rear wall portion of the first plate member and joined with a tire house panel.

10. A seat belt device as recited in claim 1 wherein said support means is located rearwardly and away from a front end portion of the rear body portion.

11. A seat belt device as recited in claim 10 and further comprising bracket means for pivotally supporting the foldable roof structure provided on said front end portion of said rear body portion, said support means being located rearwardly of said bracket means.

12. A seat belt device as recited in claim 11 wherein said support means is located inward of said bracket means in a transverse direction of the vehicle.

* * * * *